United States Patent [19]

Borenstein

[11] Patent Number: 5,437,722
[45] Date of Patent: Aug. 1, 1995

[54] WATER-RESISTANT GYPSUM COMPOSITIONS AND EMULSION FOR MAKING SAME

[75] Inventor: Lionel Borenstein, Laval, Canada

[73] Assignee: Bakor Inc., Quebec, Canada

[21] Appl. No.: 203,807

[22] Filed: Mar. 1, 1994

[51] Int. Cl.$^6$ .............................................. C04B 11/00
[52] U.S. Cl. ..................... 106/778; 106/772; 106/660; 106/270; 106/285; 106/785; 524/423; 524/489; 585/2; 208/20; 156/39; 156/41; 428/484
[58] Field of Search ............... 106/772, 778, 270, 785, 106/271, 272, 660, 285; 156/39, 41; 428/484, 486; 208/20; 585/16; 524/423, 489, 277

[56] References Cited

U.S. PATENT DOCUMENTS

| | | | |
|---|---|---|---|
| 3,649,319 | 3/1972 | Smith | 106/779 |
| 3,935,021 | 1/1976 | Greve et al. g35 | |
| 4,042,409 | 8/1977 | Terada et al. | |
| 4,094,694 | 6/1978 | Long | 524/423 |
| 4,140,536 | 2/1979 | Maier et al. | 106/660 |
| 4,421,704 | 12/1983 | Reily | 156/41 |
| 4,748,196 | 5/1988 | Kuroda et al. | 524/503 |
| 5,098,943 | 3/1992 | Tagawa et al. | 524/503 |
| 5,120,355 | 6/1992 | Imai | 106/271 |

FOREIGN PATENT DOCUMENTS 229106 10/1985 Germany.
2205562 12/1988 United Kingdom.

*Primary Examiner*—Karl Group
*Assistant Examiner*—Michael Marcheschi
*Attorney, Agent, or Firm*—Bachman & LaPointe

[57] ABSTRACT

The water resistance of gypsum compositions, such as those used in gypsum wallboard, is improved by incorporating in the compositions an aqueous emulsion containing a paraffinic hydrocarbon having a melting point of 40° to 80° C., montan wax and polyvinyl alcohol.

29 Claims, No Drawings

WATER-RESISTANT GYPSUM COMPOSITIONS AND EMULSION FOR MAKING SAME

BACKGROUND OF THE INVENTION i) Field of the Invention

This invention relates to an aqueous emulsion which is useful in the manufacture of water-resistant gypsum products; the invention also relates to a composition settable by hydration to form a water-resistant gypsum product and to a water-resistant gypsum panel or board; the invention also relates to a method for the manufacture of gypsum panel or board.

ii) Description of Prior Art

Gypsum is employed in a gypsum panel or board product known as wallboard which is widely used as a structural building panel.

Gypsum products are produced by mixing anhydrous calcium sulphate or calcium sulphate hemihydrate with water and allowing the mixture to hydrate or set as calcium sulphate dihydrate which is relatively hard.

Gypsum wallboard comprises a panel-like core of set gypsum sandwiched between a pair of paper liners which form the exposed outer surfaces of the wallboard. Fiberglass liners have also been used.

In many applications wallboard is exposed to water. A problem with set gypsum is that it absorbs water, and such absorption reduces the strength of the wallboard. There have been many proposals to render gypsum wallboard water-resistant or water-repellent. U.S. Pat. No. 3,935,021 describes some of these prior proposals and problems associated with them.

U.S. Pat. No. 3,935,021 describes a gypsum wallboard in which polyvinyl alcohol and a wax-asphalt emulsion are incorporated in the gypsum core. Wax-asphalt emulsions are widely employed in gypsum wallboard, however, certain disadvantages are inherent in their use.

In practice the wax-asphalt emulsion is not prepared at the site of use in wallboard manufacture, but is prepared by a different manufacturer at a different site and is shipped to the wallboard manufacturer.

Wax-asphalt emulsions have a tendency to separate on storage with time, forming a crust which floats on the surface of the emulsion in the storage tank. The crust, after a period of time, cannot be readily re-emulsified by mixing but only dispersed into smaller lumps or particles, and this can result in the production of black spots on the paper liners due to bleed out of the unemulsified asphalt from the set gypsum core. In addition, the separated wax-asphalt eventually needs to be disposed of, thereby causing environmental problems. The wax-asphalt emulsion has a black colour because of the asphalt.

Furthermore, as asphalt is a residue or by-product of petroleum refining, it is a relatively crude and variable material. As a result, wax-asphalt emulsions have not been consistent in their efficiencies to waterproof gypsum wallboard, thereby causing problems for the gypsum board manufacturers in determining usage levels required on a batch-to-batch basis.

SUMMARY OF THE INVENTION

It is an object of this invention to provide an aqueous emulsion for the manufacture of water-resistant gypsum products which does not contain asphalt and avoids the problems associated with the prior wax-asphalt emulsions.

It is a further object of this invention to provide a composition settable by hydration to form a water-resistant gypsum product.

It is yet another object of this invention to provide a water-resistant gypsum panel or board.

It is still another object of this invention to provide a method for the manufacture of a water-resistant gypsum panel or board.

In accordance with one aspect of this invention there is provided an aqueous emulsion comprising water and: i) a paraffin hydrocarbon having a melting point of 40°–80° C., ii) montan wax in an amount of about 1 to 200 parts, by weight, per 100 parts of said paraffin hydrocarbon i) and iii) polyvinyl alcohol in an amount of about 1 to 50 parts, by weight, per 100 parts of said paraffin hydrocarbon i).

In accordance with another aspect of this invention there is provided a gypsum composition settable by hydration to form a water-resistant gypsum product comprising a mixture of: a) 100 parts, by weight, of gypsum and b) 0.5 to 20 parts, by weight, of emulsion solids, based on the gypsum of an emulsion comprising water and: i) a paraffin hydrocarbon having a melting point of 40°–80° C., ii) montan wax in an amount of about 1 to 200 parts, by weight, per 100 parts of said paraffin hydrocarbon i) and iii) polyvinyl alcohol in an amount of about 1 to 50 parts, by weight, per 100 parts of said paraffin hydrocarbon i).

In accordance with yet another aspect of the invention there is provided a water-resistant gypsum board having a core sandwiched between a pair of liners, said core comprising a set gypsum composition of the invention.

In accordance with still another aspect of the invention there is provided a method of manufacturing a water-resistant gypsum board comprising forming a layer of a gypsum composition of the invention on a first liner, disposing a second liner on the layer in opposed relationship with the first liner to form an assembly of the liners with the layer sandwiched therebetween, and drying the assembly while permitting hydration of the gypsum, to form the board.

DESCRIPTION OF PREFERRED EMBODIMENTS i) Aqueous Emulsion

The aqueous emulsion of the invention comprises a paraffinic hydrocarbon, montan wax, polyvinyl alcohol and water; and may optionally contain additives conventionally employed in emulsions for different purposes including emulsifiers to assist in formation of the emulsion and stabilizers to assist in stabilization of the emulsion.

The paraffinic wax is one having a melting point of 40° to 80° C. If the melting point is above 80° C. it becomes necessary to use a high drying temperature in the manufacture of the gypsum wallboard and this results in poor water resistance in the wallboard. If the melting point is below 40° C. the quality of the resulting gypsum board is inferior.

Montan wax, also known as lignite wax is a hard, naturally occurring wax, dark to amber in colour. It is insoluble in water but soluble in solvents such as carbon tetrachloride, benzene and chloroform.

The montan wax is employed in an amount of about 1 to 200 parts, preferably about 1 to 50 parts, by weight, per 100 parts of the paraffinic hydrocarbon.

The polyvinyl alcohol is usually prepared by hydrolysis of polyvinyl acetate and is preferably a substantially completely hydrolyzed polyvinyl acetate. Suitably it should be at least 90% hydrolyzed polyvinyl acetate and preferably 97 to 100% hydrolyzed polyvinyl acetate.

Suitably the polyvinyl alcohol is soluble in water at elevated temperatures of about 60° C. to about 95° C., but is insoluble in cold water.

The polyvinyl alcohol is employed in an amount of about 1 to 50, preferably 1 to 20 parts, by weight, per 100 parts of the paraffinic wax.

The polyvinyl alcohol provides adhesive characteristics as well as enhancing the water resistance.

The water which forms the aqueous vehicle of the emulsion is normally employed in an amount of 35 to 80%, preferably 50 to 65%, by weight, of the emulsion.

Suitable emulsifiers for use in the emulsion of the invention include nonionic surfactants such as alkylphenoxypoly(ethyleneoxy)ethanols, sorbitan fatty acid esters and polyoxyethylene sorbitan fatty acid esters and anionic surfactants such as saponified fatty acids, and are typically employed in an amount of 0.1 to 5%, by weight, of the emulsion.

Suitable stabilizers for use in the emulsion of the invention include alkali metal or ammonium hydroxides and are typically employed in an amount of 0.1 to 1%, by weight, of the emulsion.

In one method of manufacture of the aqueous emulsion the paraffinic hydrocarbon and the montan wax are each heated to the molten state and are then blended together. A hot aqueous solution of the polyvinyl alcohol containing the emulsifiers and stabilizers is passed with the hot blend of the paraffin and montan wax through a colloid mill and the resulting emulsion is allowed to cool. Other types of equipment and procedures for preparing the emulsion can be used.

Unlike the prior asphalt emulsions the emulsion of the invention is beige or off-white. Although no bleeding of the emulsion components from the core of the gypsum panel to the paper liner has been observed, even if such bleeding occurs the black discolouration of asphalt will not appear.

Furthermore, the emulsion of the invention is readily reformed by agitation, in the event that emulsified components of the emulsion separate on storage. This is not the case with the prior asphalt emulsions which can not be reformed by agitation.

Finally the container employed for the emulsion of the invention is readily cleaned just after use by rinsing with water. This is not the case with the prior asphalt emulsions where deposits of asphalt from the emulsion onto the container walls can not be removed by simple rinsing with water. The rinse water containing the emulsion of the invention does not require disposal. It can be used in gypsum slurries for regular gypsum wallboard as it does not colour the dried gypsum core.

ii) Gypsum Composition

In the manufacture of the gypsum composition an aqueous slurry of the gypsum is formed. The aqueous emulsion is added to the slurry and mixed with the slurry in proportions to provide 0.5 to 20 parts by weight of the emulsion solids per 100 parts of gypsum. Other ingredients such as foaming agents, dispersants and set accelerators may be included in the slurry.

The resulting mixture is applied to a first sheet of liner to form a layer of the mixture thereon and a second sheet of liner is disposed on top of the layer to form an assembly in which the first and second sheets are in an opposed, facing relationship with the layer of the mixture therebetween.

The assembly is oven dried to remove excess water and permit hydration of the gypsum, to leave finished water-resistant gypsum wallboard.

Suitably the liners are of paper or may comprise fiberglass or organic fiber mats.

EXAMPLE

The invention is further illustrated by the example and comparative tests below wherein the terms "part" and "percent" mean part by weight and percent by weight.

Tests were conducted to compare the water resistance of set gypsum disks formed from aqueous slurries of calcined gypsum (calcium sulfate hemihydrate) and containing aqueous emulsions of paraffinic hydrocarbons with and without montan wax or polyvinyl alcohol. The polyvinyl alcohol used was 99% hydrolyzed polyvinyl acetate.

The aqueous emulsions were prepared by heating the paraffinic hydrocarbon and montan wax to the molten state and blending together. A hot aqueous solution containing the emulsifiers, stabilizers and polyvinyl alcohol was prepared. The wax blend and aqueous solution are metered at the proper proportions through a colloid mill to form the emulsion and the emulsion is allowed to cool to ambient temperature.

The set gypsum disks were prepared by mixing together the aqueous emulsions having a solids content of approximately 40% with calcined gypsum and water in the proportions of 3.5 parts of emulsion, 50 parts of water and 100 parts of calcined gypsum. The slurries so formed were poured into aluminum foil dishes and allowed to set for 1 hour at ambient temperature, following which the dishes were separated from the disks to give set gypsum disks of 60 millimeters diameter and 15 millimeters depth. The gypsum disks were then dried in an air circulating oven at 70° C. for 2 hours, allowed to cool to ambient temperature and weighed, following which they are immersed in water at 20° C. for 2 hours and re-weighed. The percent water absorbed based on the original weight of the dry disks were calculated.

Table 1 below sets forth the results obtained following the above procedure. The examples of Table 1 illustrate the dramatic reduction in water-absorption and consequent improvement in water resistance that is obtained when both montan wax and polyvinyl alcohol are included in the paraffinic hydrocarbon emulsion. Examples 2 and 3 show that only a moderate improvement is obtained by including either montan wax or polyvinyl alcohol alone. Example 4 shows the striking improvement that is obtained when both of these components are included.

TABLE 1

| Example No. | Emulsion Component in parts per 100 parts of Gypsum | | | % Water Absorption of Gypsum Disk |
|---|---|---|---|---|
| | Paraffinic Hydrocarbon | Montan Wax | Polyvinyl Alcohol | |
| 1 | 1.40 | None | None | 29.9 |
| 2 | 1.27 | 0.13 | None | 22.4 |
| 3 | 1.24 | None | 0.07 | 18.5 |

TABLE 1-continued

| Example No. | Emulsion Component in parts per 100 parts of Gypsum | | | % Water Absorption of Gypsum Disk |
|---|---|---|---|---|
| | Paraffinic Hydrocarbon | Montan Wax | Polyvinyl Alcohol | |
| 4 | 1.11 | 0.13 | 0.07 | 1.8 |

I claim:

1. An aqueous emulsion comprising water and:
   i) a paraffin hydrocarbon having a melting point of 40°–80° C.,
   ii) montan wax in an amount of about 1 to 200 parts, by weight, per 100 parts of said paraffin hydrocarbon, and
   iii) polyvinyl alcohol in an amount of about 1 to 50 parts, by weight, per 100 parts of said paraffin hydrocarbon.

2. An emulsion according to claim 1, wherein said montan wax is present in an amount of about 1 to 50 parts, by weight, per 100 parts of said paraffin hydrocarbon.

3. An emulsion according to claim 1, wherein said polyvinyl alcohol is present in an amount of about 1 to about 20 parts, by weight, per 100 parts of said paraffin hydrocarbon.

4. An emulsion according to claim 2, wherein the polyvinyl alcohol is about 90 to 100% hydrolyzed polyvinyl acetate.

5. An emulsion according to claim 3, wherein the polyvinyl alcohol is about 90 to 100% hydrolyzed polyvinyl acetate.

6. An emulsion according to claim 1, wherein the polyvinyl alcohol is about 97 to 100% hydrolyzed polyvinyl acetate.

7. An emulsion according to claim 3, wherein the polyvinyl alcohol is about 97 to 100% hydrolyzed polyvinyl acetate.

8. A gypsum composition settable by hydration to form a water-resistant gypsum product comprising a mixture of:
   a) 100 parts by weight of gypsum, and
   b) 0.5 to 20 parts, by weight, of emulsion solids, per 100 parts, by weight, of gypsum, of an aqueous emulsion comprising water and:
      i) a paraffin hydrocarbon having a melting point of 40°–80° C.,
      ii) montan wax in an amount of about 1 to 200 parts, by weight, per 100 parts of said paraffin hydrocarbon, and
      iii) polyvinyl alcohol in an amount of about 1 to 50 parts, by weight, per 100 parts of said paraffin hydrocarbon.

9. A composition according to claim 8, wherein said montan wax is present in an amount of about 1 to 50 parts, by weight, per 100 parts of said paraffin hydrocarbon.

10. A composition according to claim 8, wherein said polyvinyl alcohol is present in an amount of about 1 to about 20 parts, by weight, per 100 parts of said paraffin hydrocarbon.

11. A composition according to claim 8, wherein the polyvinyl alcohol is about 90 to 100% hydrolyzed polyvinyl acetate.

12. A composition according to claim 9, wherein the polyvinyl alcohol is about 90 to 100% hydrolyzed polyvinyl acetate.

13. A composition according to claim 8, wherein the polyvinyl alcohol is about 97 to 100% hydrolyzed polyvinyl acetate.

14. A composition according to claim 10, wherein the polyvinyl alcohol is about 97 to 100% hydrolyzed polyvinyl acetate.

15. A water-resistant gypsum board having a core sandwiched between a pair of liners, said core comprising a set composition of claim 8.

16. A board according to claim 15, wherein said liners are paper liners.

17. A water-resistant gypsum board having a core sandwiched between a pair of liners, said core comprising a set composition of claim 9.

18. A water-resistant gypsum board according to claim 15, wherein the polyvinyl alcohol is about 90 to 100% hydrolyzed polyvinyl acetate.

19. A water-resistant gypsum board according to claim 15, wherein the polyvinyl alcohol is about 97 to 100% hydrolyzed polyvinyl acetate.

20. A method of manufacturing a water-resistant gypsum board comprising:
   I) forming a mixture of:
      a) 100 parts by weight of gypsum, and
      b) 0.5 to 20 parts, by weight, of emulsion solids, per 100 parts, by weight, of the gypsum, of an aqueous emulsion comprising water and:
         i) a paraffin hydrocarbon having a melting point of 40°–80° C.,
         ii) montan wax in an amount of about 1 to 200 parts, by weight, per 100 parts of said paraffin hydrocarbon,
         iii) polyvinyl alcohol in an amount of about 1 to 50 parts, by weight, per 100 parts of said paraffin hydro carbon,
   II) forming a layer of said mixture on a first liner,
   III) disposing a second liner on said layer in opposed relationship with said first liner to form an assembly of said liners with said layer sandwiched therebetween, and
   IV) drying said assembly while permitting hydration of said gypsum, to form said board.

21. An emulsion according to claim 1, consisting of said water, said paraffin hydrocarbon, said montan wax and said polyvinyl alcohol.

22. A composition according to claim 8, wherein said emulsion consists of said water, said paraffin hydrocarbon, said montan wax and said polyvinyl alcohol.

23. A water-resistant gypsum board having a core sandwiched between a pair of liners said core comprising a set composition of claim 22.

24. An emulsion according to claim 1, consisting essentially of said water, said paraffin hydrocarbon, said montan wax and said polyvinyl alcohol, together with a stabilizer in an amount of about 0.1 to about 1%, by weight, of the emulsion.

25. A composition according to claim 8, wherein said emulsion consists essentially of said water, said paraffin hydrocarbon, said montan wax and said polyvinyl alcohol, together with a stabilizer in an amount of about 0.1 to about 1%, by weight of the emulsion.

26. A water-resistant gypsum board having a core sandwiched between a pair of liners, said core comprising a set composition of claim 25.

27. An emulsion according to claim 1, consisting essentially of said water, said paraffin hydrocarbon, said montan wax, said polyvinyl alcohol and an emulsifier in an amount of about 0.1 to about 5%, by weight, of the emulsion.

28. A composition according to claim 8, wherein said emulsion consists essentially of said water, said paraffin hydrocarbon, said montan wax, said polyvinyl alcohol and an emulsifier in an amount of about 0.1 to about 5%, by weight, of the emulsion.

29. A water-resistant gypsum board having a core sandwiched between a pair of liners, said core comprising a set of composition of claim 28.

* * * * *